(12) United States Patent
Shinohara et al.

(10) Patent No.: US 12,516,826 B2
(45) Date of Patent: Jan. 6, 2026

(54) HEATING COOKING APPARATUS (71) Applicant: SHARP KABUSHIKI KAISHA, Sakai (JP)

(72) Inventors: Yu Shinohara, Sakai (JP); Masahiro Nishijima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 398 days.

(21) Appl. No.: 18/267,752

(22) PCT Filed: Dec. 21, 2021

(86) PCT No.: PCT/JP2021/047288
§ 371 (c)(1),
(2) Date: Jun. 15, 2023

(87) PCT Pub. No.: WO2022/138629
PCT Pub. Date: Jun. 30, 2022

(65) Prior Publication Data
US 2024/0053029 A1  Feb. 15, 2024

(30) Foreign Application Priority Data
Dec. 24, 2020 (JP) .................. 2020-215366

(51) Int. Cl.
*F24C 15/16* (2006.01)
(52) U.S. Cl.
CPC .......... *F24C 15/162* (2013.01); *F24C 15/168* (2013.01)

(58) Field of Classification Search
CPC ..... H05B 6/6414; F24C 15/162; F24C 15/168
See application file for complete search history.

(56) References Cited

U.S. PATENT DOCUMENTS

| | | |
|---|---|---|
| 7,244,916 B2 | 7/2007 | Iwamoto |
| 2005/0173426 A1 | 8/2005 | Iwamoto |
| 2020/0137841 A1 | 4/2020 | Lessmann et al. |

FOREIGN PATENT DOCUMENTS

| | | |
|---|---|---|
| JP | 2006-038300 A | 2/2006 |
| JP | 2011-089738 A | 5/2011 |
| JP | 2022-025448 A | 2/2022 |
| KR | 100507311 B1 | 8/2005 |

*Primary Examiner* — Alfred Basichas
(74) *Attorney, Agent, or Firm* — ScienBiziP, P.C.

(57) ABSTRACT

A heating cooking apparatus includes a heating cooking chamber, a lid portion, a support member, and a movement unit. The movement unit includes a base member attached to the heating cooking chamber, an attachment member attached to the support member, and a connecting member connecting the base member and the attachment member. A closed position indicates a position at which the lid portion closes an opening. An open position is positioned farther in a predetermined direction than the closed position and indicates a position at which the lid portion opens the opening. The connecting member is movable along the predetermined direction with respect to each of the base member and the attachment member.

9 Claims, 11 Drawing Sheets

HEATING COOKING APPARATUS

TECHNICAL FIELD

The present invention relates to a heating cooking apparatus.

BACKGROUND ART

PTL 1 discloses a heating cooking apparatus. The heating cooking apparatus disclosed in PTL 1 includes a heating cooking apparatus main body, a pull-out body, and a rail unit. The heating cooking apparatus main body includes a heating cooking chamber. The rail unit includes a movable rail and a fixed rail.

The pull-out body can be pulled out in a predetermined direction from the heating cooking apparatus main body. The pull-out body includes a lid portion. With the pull-out body retracted into the heating cooking chamber, the lid portion closes an opening at the front side of the heating cooking chamber.

CITATION LIST

Patent Literature

PTL 1: JP 2011-089738 A

SUMMARY OF INVENTION

Technical Problem

In the heating cooking apparatus disclosed in PTL 1, due to insufficient strength of a contact portion between a movement unit such as the fixed rail and a support member such as the movable rail, rattling may occur between the movement unit and the support member in a direction perpendicular to the predetermined direction.

In view of the above problem, an object of the present invention is to provide a heating cooking apparatus in which the rattling between the movement unit and the support member in the direction perpendicular to the predetermined direction can be reduced.

Solution to Problem

According to one aspect of the present invention, a heating cooking apparatus includes a heating cooking chamber, a lid portion, a support member, and a movement unit. The heating cooking chamber includes an opening open in a predetermined direction included in a horizontal plane. The lid portion moves between a closed position and an open position. The support member extends in the predetermined direction from the lid portion. The movement unit causes the support member to move. The movement unit includes a base member extending along the predetermined direction and attached to the heating cooking chamber, an attachment member extending along the predetermined direction and attached to the support member, and a connecting member extending along the predetermined direction and connecting the base member and the attachment member. The closed position indicates a position at which the lid portion closes the opening. The open position is positioned farther in the predetermined direction than the closed position and indicates a position at which the lid portion opens the opening.

The connecting member is movable along the predetermined direction with respect to each of the base member and the attachment member.

Advantageous Effects of Invention

In the heating cooking apparatus of the present invention, the rattling between the movement unit and the support member in the direction perpendicular to the predetermined direction can be reduced.

DESCRIPTION OF EMBODIMENTS

Hereinafter, embodiments of a pull-out type heating cooking apparatus according to the present invention will be described with reference to the drawings. Note that, in the drawings, the same or equivalent components are denoted by the same reference numerals and signs, and description thereof will not be repeated.

Figure 1:
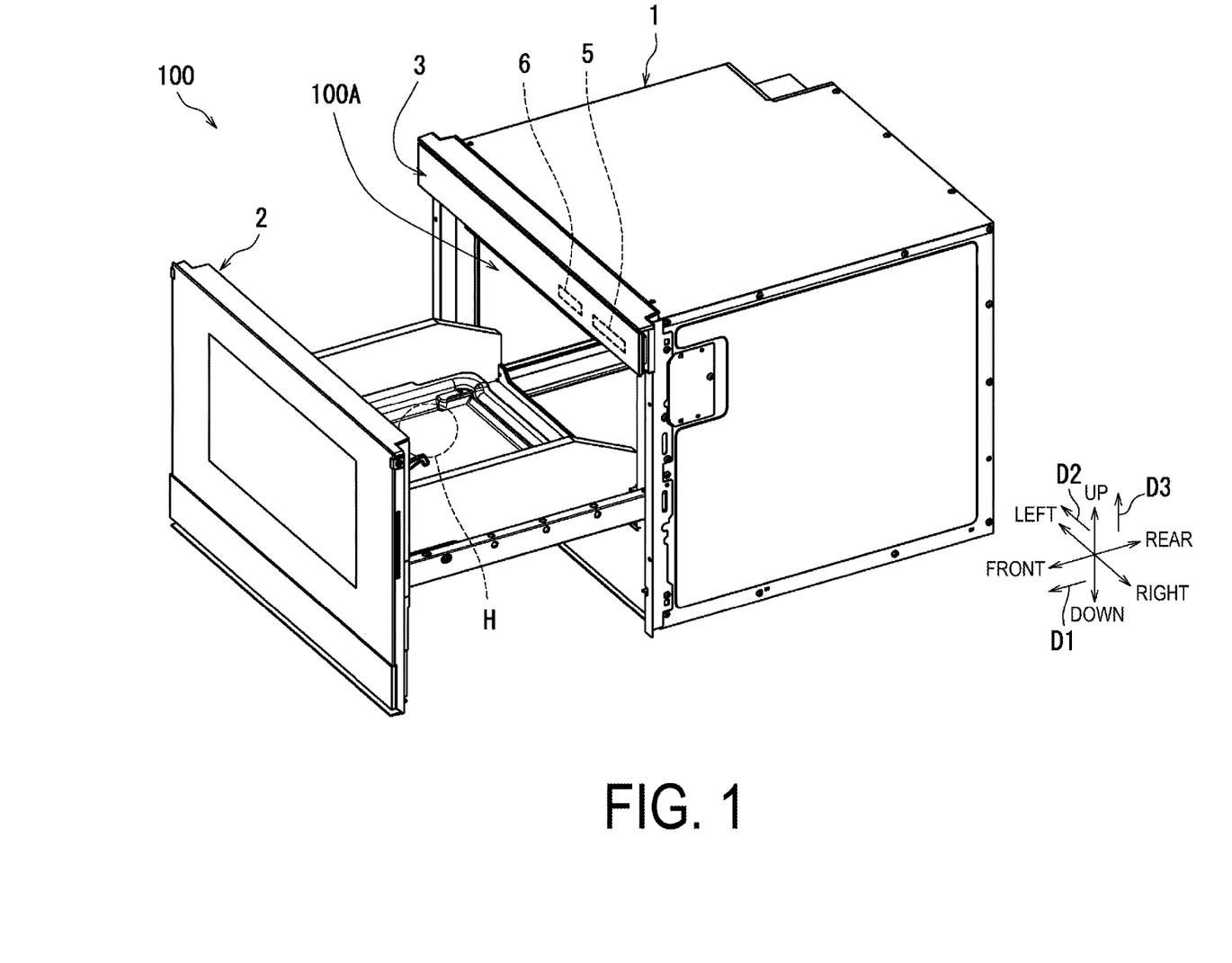
FIG. 1 is a perspective view illustrating a pull-out type heating cooking apparatus according to an embodiment of the present invention.
Figure 2:
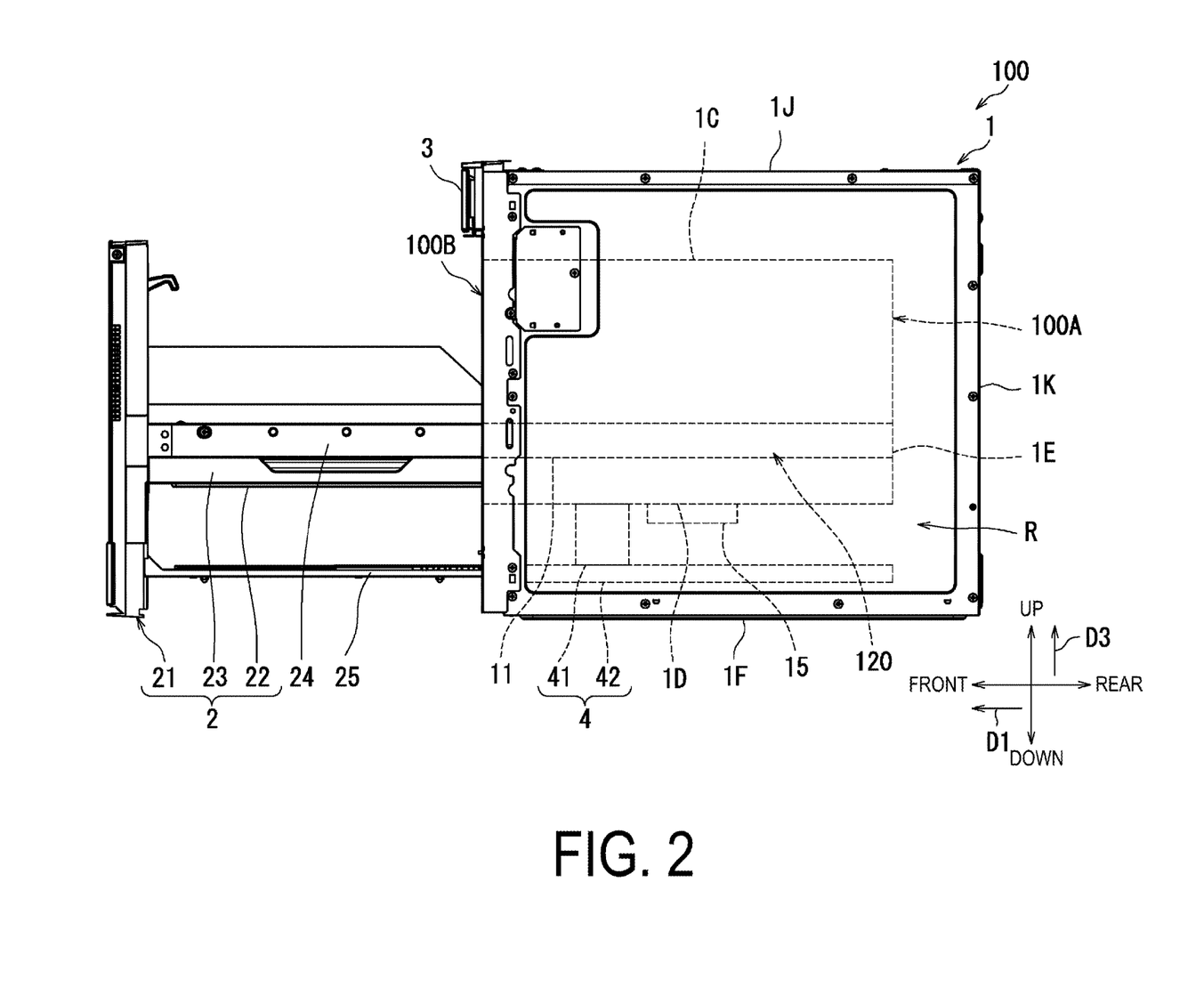
FIG. 2 is a right side view illustrating the pull-out type heating cooking apparatus according to the present embodiment.
Figure 3:
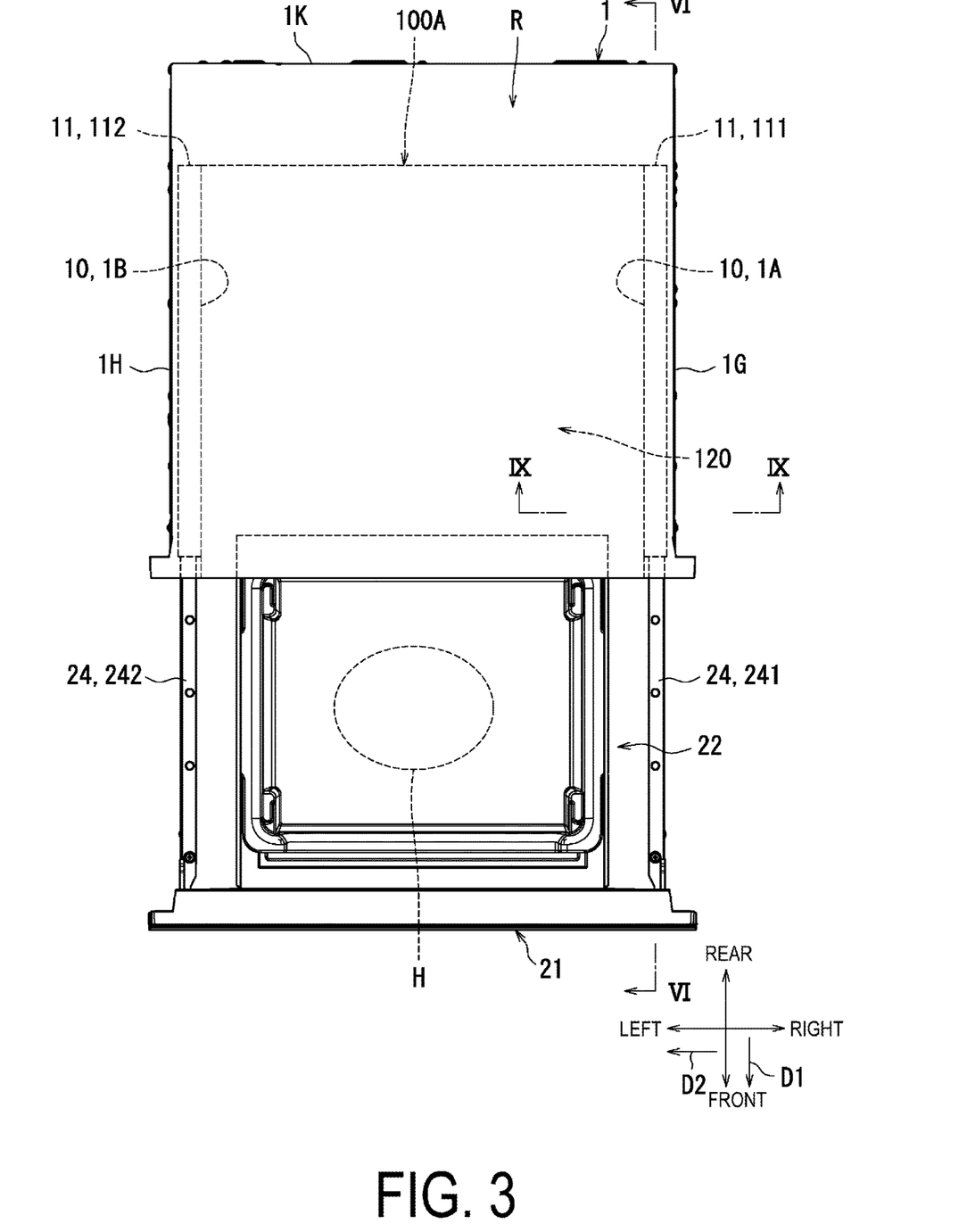
FIG. 3 is a top view illustrating the pull-out type heating cooking apparatus according to the present embodiment.

A pull-out type heating cooking apparatus 100 according to the present embodiment will be described with reference to FIG. 1 to FIG. 3. FIG. 1 is a perspective view illustrating the pull-out type heating cooking apparatus 100. FIG. 2 is a right side view illustrating the pull-out type heating cooking apparatus 100. FIG. 3 is a top view illustrating the pull-out type heating cooking apparatus 100. More specifically, FIG. 1 to FIG. 3 illustrate the pull-out type heating cooking apparatus 100 in a state where a pull-out body 2 is pulled out. Further, FIG. 1 illustrates an external appearance of the pull-out type heating cooking apparatus 100 as viewed diagonally from the upper front right. The pull-out type heating cooking apparatus 100 is an example of a heating cooking apparatus.

As illustrated in FIG. 1, the pull-out type heating cooking apparatus 100 heats and cooks an object H to be heated. The object H to be heated is, for example, a food product. The pull-out type heating cooking apparatus 100 includes a heating chamber 1, the pull-out body 2, an operation panel 3, and a heating cooking chamber 100A. The heating chamber 1 is an example of "housing".

In the present embodiment, a side at which the operation panel 3 of the pull-out type heating cooking apparatus 100 is disposed is defined as a front side of the pull-out type heating cooking apparatus 100, and a side opposite to the front side (rear face side) is defined as a rear side of the pull-out type heating cooking apparatus 100. Further, a right side when the pull-out type heating cooking apparatus 100 is viewed from the front side is defined as a right side of the pull-out type heating cooking apparatus 100, and a side opposite to the right side is defined as a left side of the pull-out type heating cooking apparatus 100. Further, in a direction orthogonal to a front-rear direction and a left-right direction of the pull-out type heating cooking apparatus 100, a side at which the operation panel 3 is disposed is defined as an upper side of the pull-out type heating cooking apparatus 100, and a side opposite to the upper side (bottom side) is defined as a lower side of the pull-out type heating cooking apparatus 100. Note that these orientations do not limit an orientation of the pull-out type heating cooking apparatus 100 according to the present invention in use.

As illustrated in FIG. 1 to FIG. 3, the heating chamber 1 is a box-like member. Specifically, the heating chamber 1 includes a right outer wall 1G, a left outer wall 1H, a top outer wall 1J, a bottom outer wall 1F, and a back outer wall 1K. The heating chamber 1 accommodates the heating cooking chamber 100A.

The pull-out body 2 can be pulled out in a first direction D1 from the heating cooking chamber 100A. The first direction D1 is an example of "predetermined direction". The first direction D1 is included in a horizontal plane. Specifically, the first direction D1 is the forward direction. A third direction D3 intersects the first direction D1. In the present embodiment, the third direction D3 is orthogonal to the first direction D1. In the present embodiment, the third direction D3 is the upward direction. Specifically, the pull-out body 2 includes a lid portion 21, a placing portion 22, and a support portion 23. The placing portion 22 and the support portion 23 are an example of "accommodation portion".

The heating cooking chamber 100A includes a placing space 120 that accommodates the object H to be heated. The shape of the heating cooking chamber 100A is, for example, a substantially rectangular parallelepiped shape. Specifically, the heating cooking chamber 100A includes a pair of side wall portions 10, a back wall 1E, and an opening portion 100B. The opening portion 100B is an example of "opening". The back wall 1E intersects the first direction D1. The opening portion 100B faces the back wall 1E. The opening portion 100B is open in the first direction D1. The opening portion 100B communicates with the outside of the heating cooking chamber 100A. The pair of side wall portions 10 face each other in the second direction D2. The second direction D2 is the left direction. Specifically, the pair of side wall portions 10 includes a right wall 1A and a left wall 1B. The heating cooking chamber 100A further includes a top wall 1C and a bottom wall 1D. Materials of the right wall 1A, the left wall 1B, the top wall 1C, the bottom wall 1D, and the back wall 1E are, for example, a metal.

The heating chamber 1 further includes a space R between the heating chamber 1 and the heating cooking chamber 100A. Specifically, the heating chamber 1 further includes the space R between the bottom wall 1D and the bottom outer wall 1F. The heating chamber 1 further includes the space R between the right wall 1A and the right outer wall 1G. The heating chamber 1 further includes the space R between the left wall 1B and the left outer wall 1H. The heating chamber 1 further includes the space R between the top wall 1C and the top outer wall 1J. The heating chamber 1 further includes the space R between the back wall 1E and the back outer wall 1K.

The pull-out type heating cooking apparatus 100 further includes a pair of rail members 11. Each of the pair of rail members 11 is an example of "movement unit". Specifically, one rail member of the pair of rail members 11 includes a right side rail member 111, and the other rail member of the pair of rail members 11 includes a left side rail member 112. The right side rail member 111 and the left side rail member 112 face each other in the left-right direction.

Further, each of the right side rail member 111 and the left side rail member 112 extends in the first direction D1. Each of the right side rail member 111 and the left side rail member 112 is disposed in the heating chamber 1. Specifically, each of the right side rail member 111 and the left side rail member 112 is disposed between the heating chamber 1 and the heating cooking chamber 100A. More specifically, the right side rail member 111 is fixed on the right wall 1A in the space R between the right wall 1A and the right outer wall 1G. The left side rail member 112 is fixed on the left wall 1B in the space R between the left wall 1B and the left outer wall 1H. As a result, rise in temperature of each of the right side rail member 111 and the left side rail member 112 can be suppressed.

Meanwhile, the pull-out type heating cooking apparatus 100 further includes a pair of slide members 24. Each of the pair of slide members 24 is an example of "support member". Specifically, one slide member of the pair of slide members 24 includes a right side slide member 241, and the other slide member of the pair of slide members 24 includes a left side slide member 242. The right side slide member 241 and the left side slide member 242 face each other in the left-right direction.

Each of the right side slide member 241 and the left side slide member 242 extends in a direction opposite to the first direction D1 from the lid portion 21. Each of the right side slide member 241 and the left side slide member 242 is disposed on the lid portion 21. Specifically, one end portion of the right side slide member 241 is attached to a right edge portion of the lid portion 21. One end portion of the left side slide member 242 is attached to a left edge portion of the lid portion 21.

The right side rail member 111 causes the right side slide member 241 to move. Specifically, the right side slide member 241 is slidably supported by the right side rail member 111. The left side rail member 112 causes the left side slide member 242 to move. Specifically, the left side slide member 242 is slidably supported by the left side rail member 112. In other words, each of the right side slide member 241 and the left side slide member 242 is disposed between the heating chamber 1 and the heating cooking chamber 100A. As a result, rise in temperature of each of the right side slide member 241 and the left side slide member 242 can be suppressed.

The pull-out type heating cooking apparatus 100 further includes a drive member 25. The drive member 25 supports the lid portion 21. One end portion of the drive member 25 is attached at a center portion in the left-right direction of the lid portion 21 and below the placing portion 22. The drive member 25 is a plate-like member extending from the lid portion 21 in the direction opposite to the first direction D1.

The drive member 25 includes a rack portion. The rack portion includes teeth. The drive member 25 may be a single plate-like member or a plurality of plate-like members.

Meanwhile, the pull-out type heating cooking apparatus 100 further includes a drive mechanism 4. The drive mechanism 4 drives the drive member 25. The drive mechanism 4 is positioned below the heating cooking chamber 100A. Specifically, the drive mechanism 4 is accommodated in the space R between the bottom wall 1D and the bottom outer wall 1F. For example, the drive mechanism 4 includes a drive motor 41, a pinion, and a drive rail 42. The drive rail 42 is fixed in the space R between the bottom wall 1D and the bottom outer wall 1F. The drive rail 42 is a member having the front-rear direction as a longitudinal direction. The drive member 25 is slidably supported by the drive rail 42. The pinion is attached to an end portion of the drive motor 41.

The pinion engages with the rack portion of the drive member 25. Furthermore, the drive member 25 moves in the front-rear direction as a result of rotation of the pinion. Note that the drive mechanism 4 may drive at least one of the drive member 25, the right side slide member 241, and the left side slide member 242. Furthermore, in a case where the right side slide member 241 and the left side slide member 242 are driven, the drive mechanism 4 may be positioned more on the side than the heating cooking chamber 100A.

The pull-out type heating cooking apparatus 100 further includes a microwave supply unit 15. The microwave supply unit 15 supplies microwaves into the heating cooking chamber 100A. Specifically, the microwave supply unit 15 includes a radiation chamber, a magnetron, a waveguide, a rotary antenna, and an antenna motor. The magnetron generates microwaves. The waveguide propagates the microwaves generated by the magnetron to the radiation chamber. The rotary antenna is accommodated in the radiation chamber. The antenna motor drives the rotary antenna. The rotary antenna agitates microwaves and supplies the microwaves into the heating cooking chamber 100A.

The operation panel 3 receives an operation from a user. The operation includes, for example, a cooking method for heating and cooking the object H to be heated, or information about movement of the lid portion 21 between the closed position and the open position thereof. Specifically, the operation panel 3 includes a display unit, a storage unit 6, and a control unit 5. The display unit displays various pieces of information. Specifically, the display unit includes a liquid crystal panel.

The storage unit 6 is constituted by a Random Access Memory (RAM) and a Read Only Memory (ROM). The storage unit 6 stores a control program for controlling an operation of each unit of the pull-out type heating cooking apparatus 100. The storage unit 6 stores setting information input by operating the display unit.

The control unit 5 is a hardware circuit that includes a processor such as a Central Processing Unit (CPU). The control unit 5 executes the control program stored in the storage unit 6.

Figure 4:
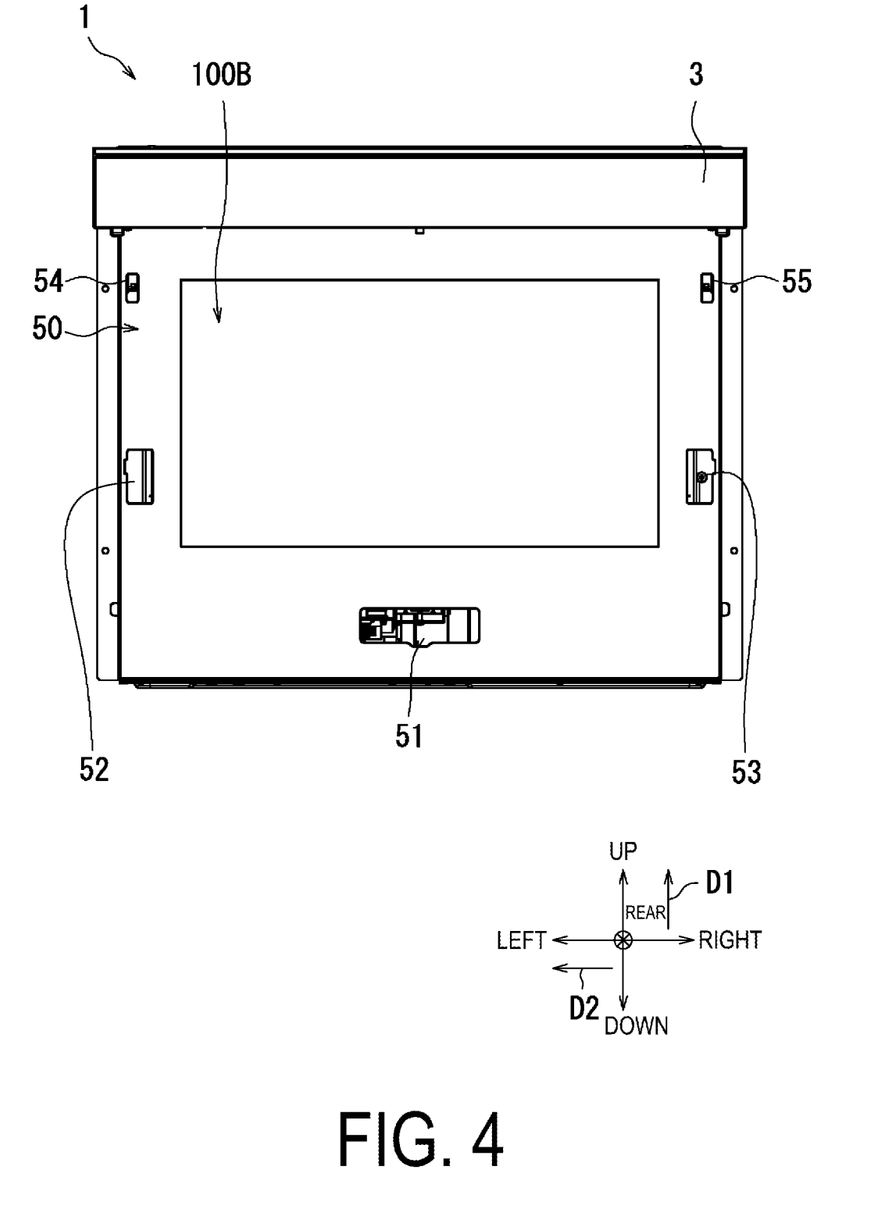
FIG. 4 is a front view illustrating the pull-out type heating cooking apparatus according to the present embodiment.

Now, a description will be further given on a panel 50 with reference to FIG. 4. FIG. 4 is a front view illustrating the pull-out type heating cooking apparatus 100. More specifically, FIG. 4 illustrates the pull-out type heating cooking apparatus 100 in a state in which the pull-out body 2 is removed. As illustrated in FIG. 4, the pull-out type heating cooking apparatus 100 further includes the panel 50.

The panel 50 is disposed at the outer periphery of the opening portion 100B. The opening portion 100B has a rectangular shape, for example. The panel 50 is a plate-like member having a rectangular ring shape for example. The panel 50 includes a first through hole 51, a second through hole 52, a third through hole 53, a fourth through hole 54, and a fifth through hole 55.

The first through hole 51, the second through hole 52, the third through hole 53, the fourth through hole 54, and the fifth through hole 55 are formed around the opening portion 100B. Specifically, the first through hole 51 is formed at a position on a lower side of the opening portion 100B. The second through hole 52 is formed at a position on a left side of the opening portion 100B. The third through hole 53 is formed at a position on a right side of the opening portion 100B. The fourth through hole 54 is formed at a position on the left side of the opening portion 100B and on an upper side of the second through hole 52. The fifth through hole 55 is formed at a position on the right side of the opening portion 100B and on an upper side of the third through hole 53.

Figure 5:
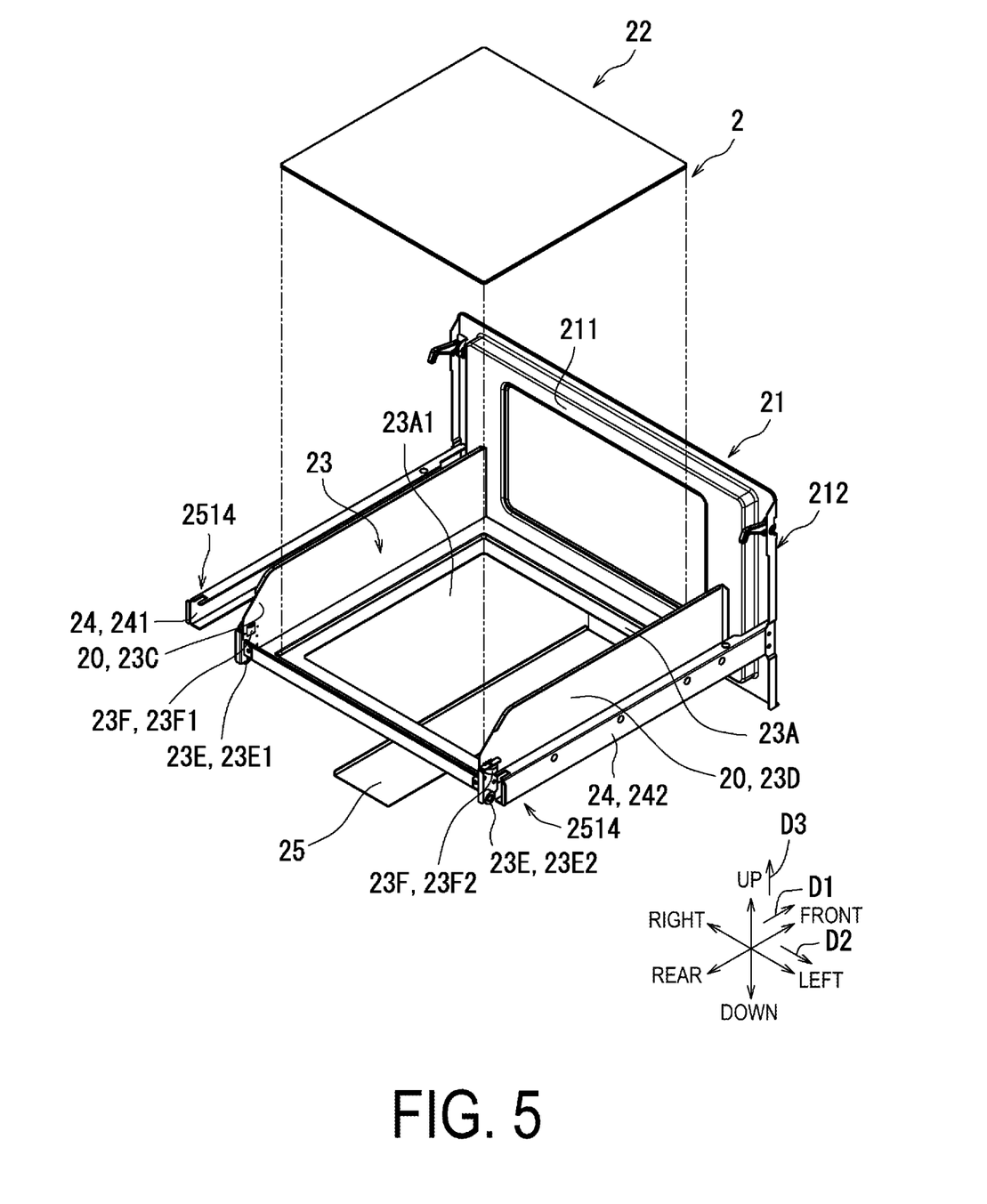
FIG. 5 is an exploded perspective view illustrating a pull-out body according to the present embodiment.
Figure 6:
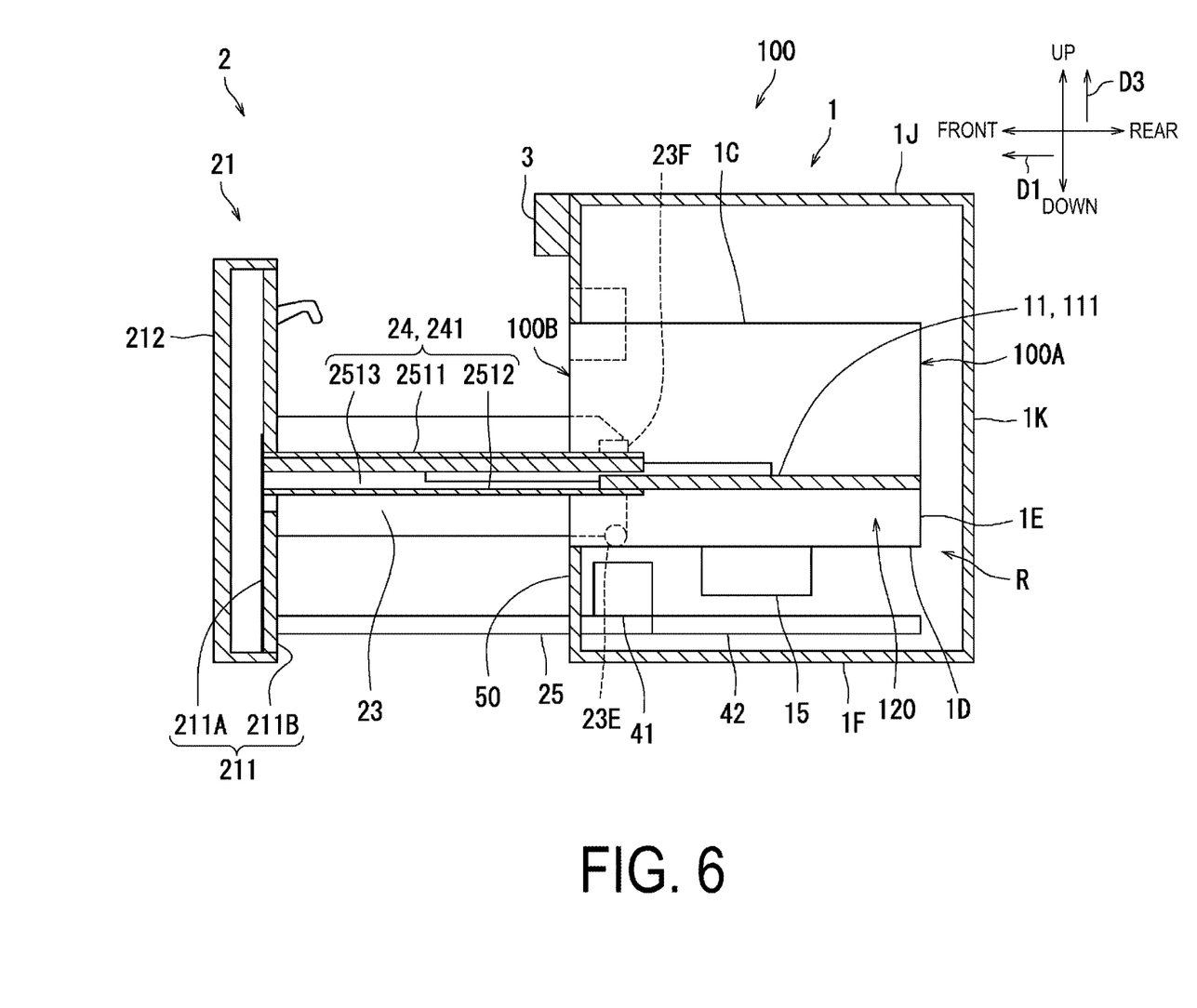
FIG. 6 is a cross-sectional view illustrating the pull-out type heating cooking apparatus taken along section line VI in FIG. 3.

Next, the pull-out body 2 will be described in detail with reference to FIG. 5 and FIG. 6. FIG. 5 is an exploded perspective view illustrating the pull-out body 2 according to the present embodiment. FIG. 6 is a cross-sectional view of the pull-out type heating cooking apparatus 100 taken along section line VI in FIG. 3. As illustrated in FIG. 5 and FIG. 6, the lid portion 21 includes a plate-like member 211 and a cover member 212.

The plate-like member 211 includes a first surface 211A and a second surface 211B. The first surface 211A is disposed on the first direction D1 side. The second surface 211B is disposed on the side in the direction opposite to the first direction D1.

The plate-like member 211 opens and closes the opening portion 100B of the heating cooking chamber 100A. Specifically, the plate-like member 211 moves between a closed position and an open position. The closed position indicates a position where the plate-like member 211 closes the opening portion 100B. Specifically, the closed position indicates the position where the panel 50 and the second surface 211B face each other. More particularly, the closed position indicates a position where a distance between the panel 50 and the second surface 211B is a predetermined distance or where the panel 50 and the second surface 211B come into contact with each other. The predetermined distance is, for example, 0.5 mm. The position where the panel 50 and the second surface 211B come into contact with each other is, for example, a position where the panel 50 and the second surface 211B come into close contact with each other. On the other hand, the open position is positioned more on the first direction D1 side than the closed position and indicates a position where the plate-like member 211 opens the opening portion 100B.

The cover member 212 covers the entire first surface 211A. Specifically, the cover member 212 is positioned outside the heating cooking chamber 100A when the plate-like member 211 is positioned at the closed position. The material of the cover member 212 is synthetic resin. The synthetic resin includes, for example, polybutylene terephthalate.

The object H to be heated can be placed on the placing portion 22. Specifically, the placing portion 22 has a placing surface on which the object H to be heated is placed. The material of the placing portion 22 is a non-metal, and is preferably ceramic or glass, for example. As a result, the placing portion 22 transmits microwaves.

The support portion 23 is attached to the second surface 211B of the lid portion 21 and supports a peripheral edge portion of the placing portion 22 such that the placing portion 22 is held in a horizontal state. Specifically, the support portion 23 includes a bottom plate portion 23A and a pair of wall portions 20. The material of the support portion 23 is, for example, a metal.

The bottom plate portion 23A includes a rectangular opening 23A1. The rectangular opening 23A1 is positioned at substantially a center portion of the bottom plate portion 23A.

Specifically, one wall portion of the pair of wall portions 20 includes a right side plate portion 23C, and the other wall portion of the pair of wall portions 20 includes a left side plate portion 23D. Each of the right side plate portion 23C and the left side plate portion 23D extends along the first direction D1. The right side plate portion 23C and the left side plate portion 23D face each other in the left-right direction. More specifically, the right side plate portion 23C and the left side plate portion 23D extend upward from the peripheral edge portion of the bottom plate portion 23A. Specifically, the positions of the upper ends of the right side plate portion 23C and the left side plate portion 23D are higher than the positions of the upper ends of the right side rail member 111 and the left side rail member 112. The placing portion 22 is fitted among the lid portion 21, the right side plate portion 23C, and the left side plate portion 23D. The peripheral edge portion of the placing portion 22 is fixed to an upper surface of the peripheral edge portion of the bottom plate portion 23A. As a result, the right side plate portion 23C and the left side plate portion 23D can reduce the heat transfer from the object H to be heated to the right side rail member 111 and the left side rail member 112.

The support portion 23 further includes a pair of rollers 23E and a pair of rollers 23F. The pair of rollers 23E and the pair of rollers 23F rotate as the pull-out body 2 moves. Specifically, one roller of the pair of rollers 23E includes a right side roller 23E1, and the other roller of the pair of rollers 23E includes a left side roller 23E2. The right side roller 23E1 and the left side roller 23E2 rotate about a rotation axis along the second direction D2. In addition, the right side roller 23E1 is attached to a rear end portion of the right side plate portion 23C. The left side roller 23E2 is attached to a rear end portion of the left side plate portion 23D. The right side roller 23E1 and the left side roller 23E2 are in contact with the bottom wall 1D.

Also, one roller of the pair of rollers 23F includes a right side roller 23F1, and the other roller of the pair of rollers 23F includes a left side roller 23F2. The right side roller 23F1 and the left side roller 23F2 rotate about a rotation axis along the third direction D3. The right side roller 23F1 is attached to a rear end portion of the right side plate portion 23C. The left side roller 23F2 is attached to a rear end portion of the left side plate portion 23D. The right side roller 23F1 is in contact with the right wall 1A. The left side roller 23F2 is in contact with the left wall 1B.

The placing portion 22 and the support portion 23 are accommodated in the heating cooking chamber 100A when the plate-like member 211 is positioned at the closed position. On the other hand, when the plate-like member 211 is positioned at the open position, the placing portion 22 and the support portion 23 are pulled out from the heating cooking chamber 100A, in a state where the pair of rollers 23E and the pair of rollers 23F are accommodated in the heating cooking chamber 100A.

Here, the right side slide member 241 will be described. The right side slide member 241 includes an upper plate 2511, a lower plate 2512, and a side plate 2513. The upper plate 2511 and the lower plate 2512 extend along the first direction D1. The upper plate 2511 and the lower plate 2512 face each other in an up-down direction. The side plate 2513 extends downward from the upper plate 2511. The side plate 2513 connects the upper plate 2511 and the lower plate 2512. The right side slide member 241 includes an end portion 251A on the first direction D1 side, and the end portion 251A is fixed to the plate-like member 211. Note that the left side slide member 242 has a configuration similar to that of the right side slide member 241.

Figure 7:
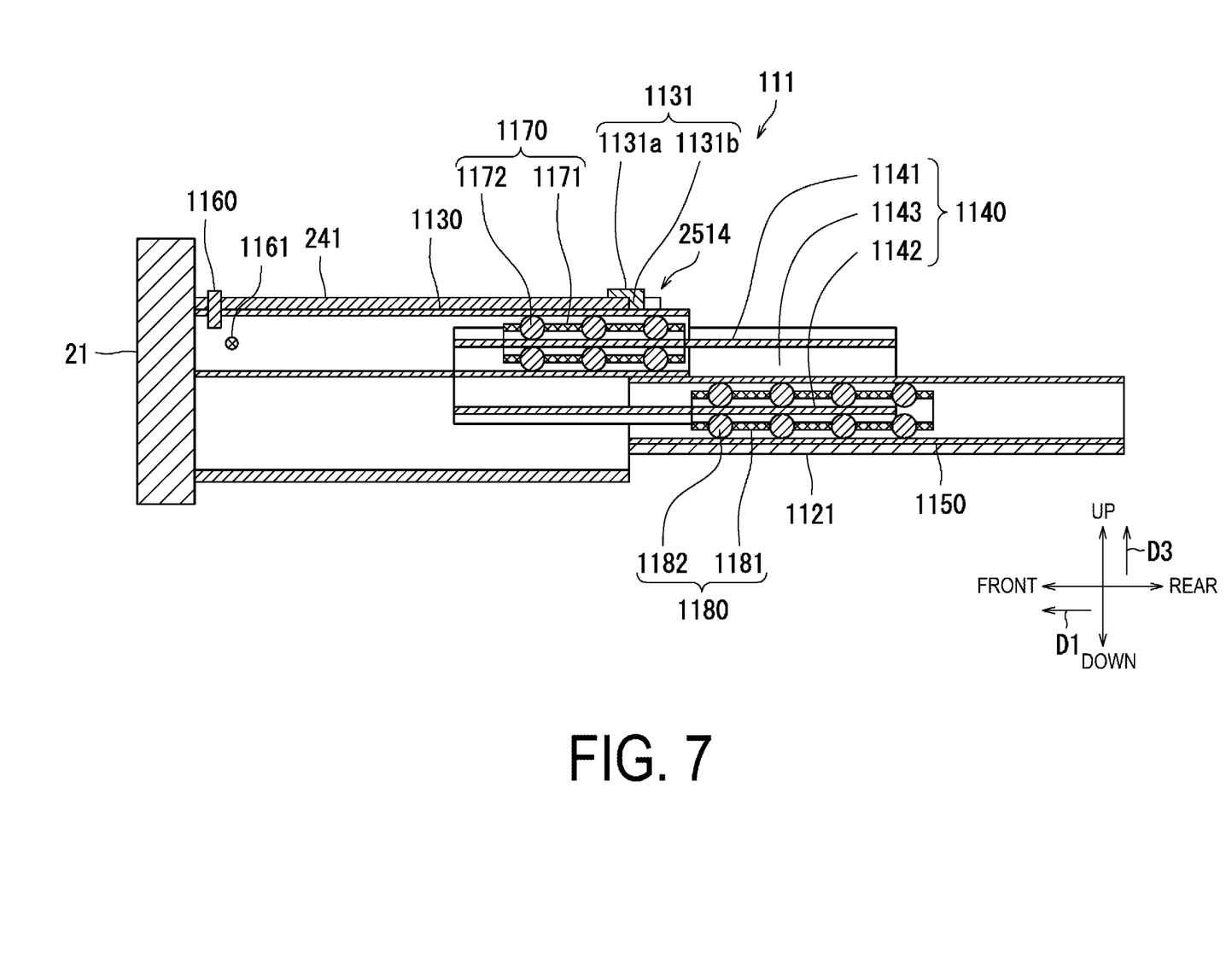
FIG. 7 is a cross-sectional view illustrating a right side rail member when a lid portion according to the present embodiment is positioned at an open position.
Figure 8:
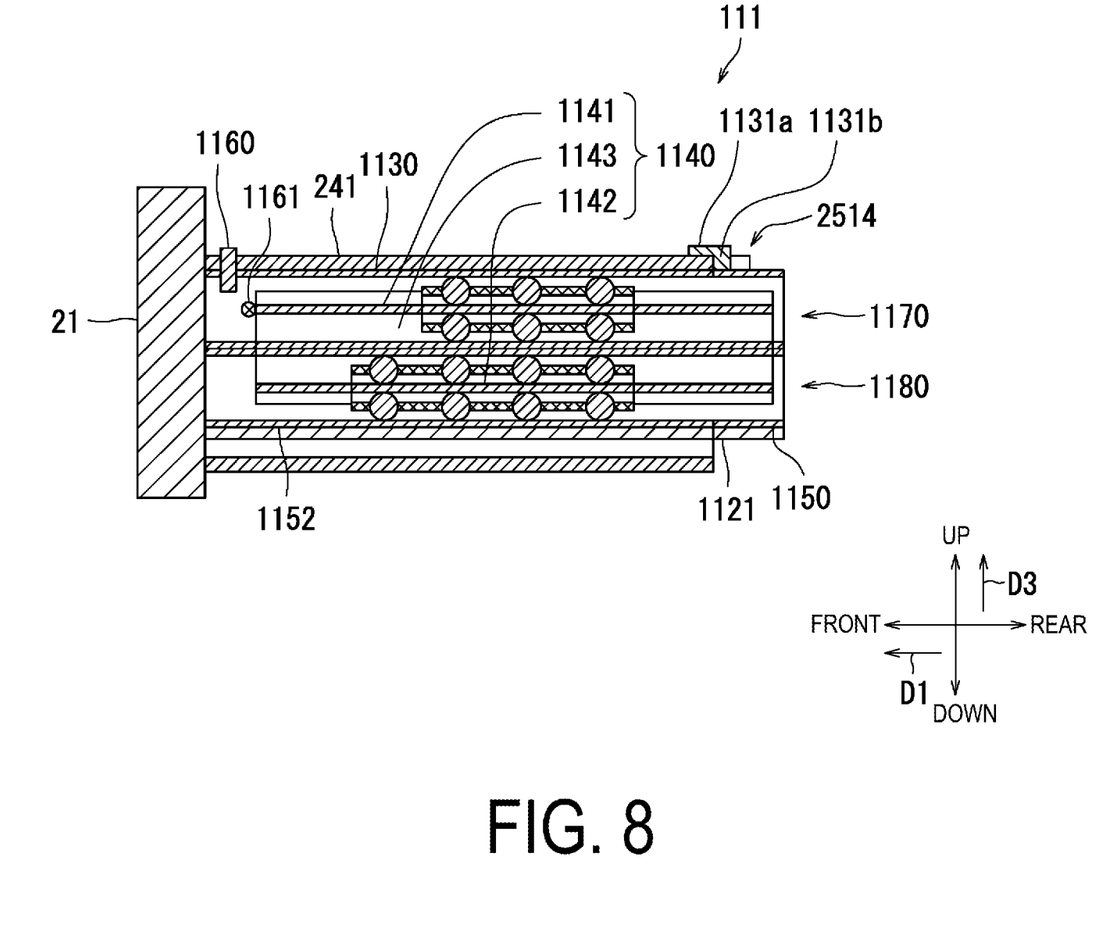
FIG. 8 is a cross-sectional view illustrating the right side rail member when the lid portion according to the present embodiment is positioned at a closed position.
Figure 9:
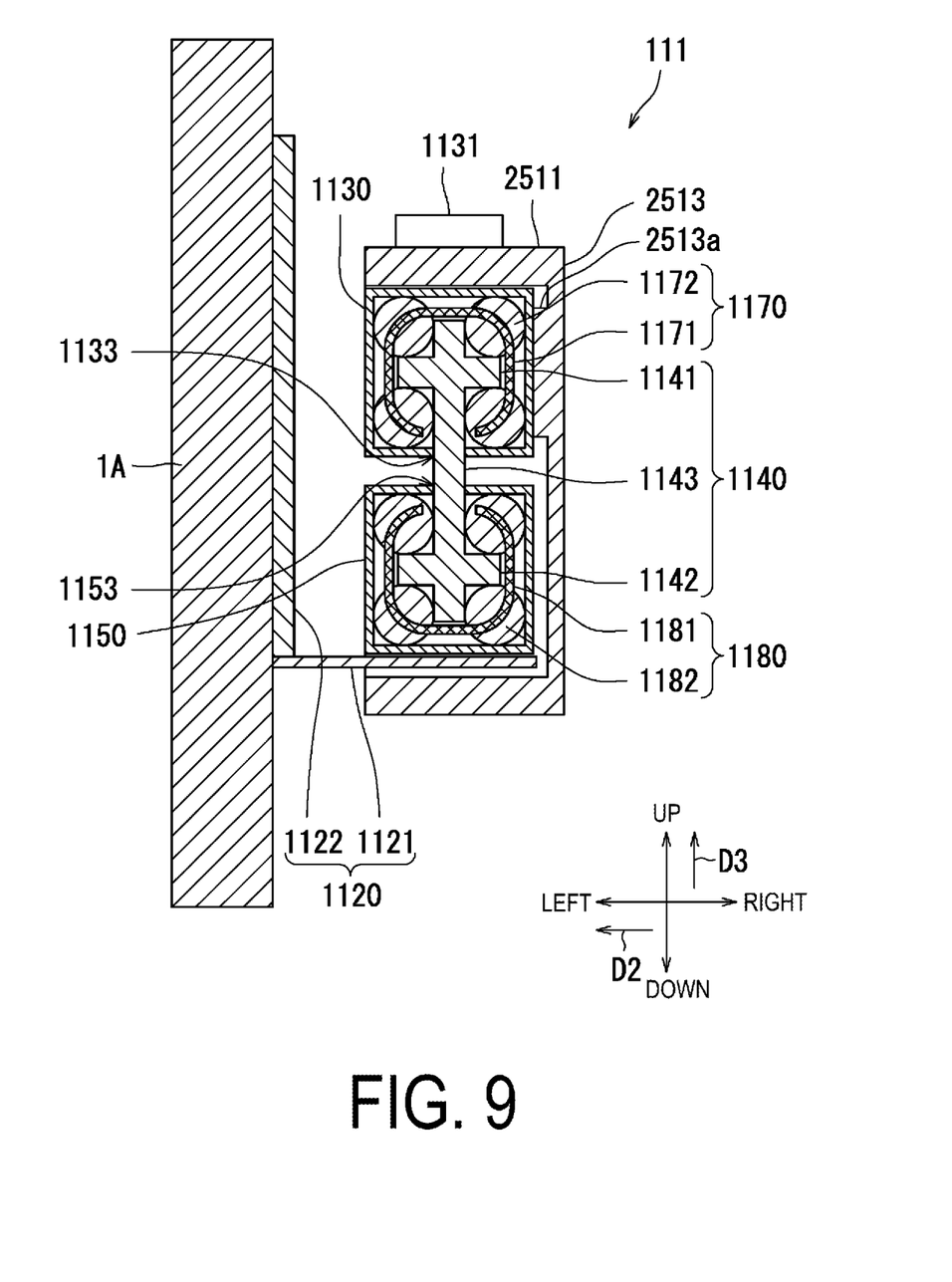
FIG. 9 is a cross-sectional view illustrating the right side rail member taken along section line IX in FIG. 3.

Next, the right side rail member 111 will be described in detail with reference to FIG. 7 to FIG. 9. FIG. 7 is a cross-sectional view illustrating the right side rail member 111 when the lid portion 21 is positioned at the open position. FIG. 8 is a cross-sectional view illustrating the right side rail member 111 when the lid portion 21 is positioned at the closed position. FIG. 9 is a cross-sectional view illustrating the right side rail member 111 taken along section line IX in FIG. 3. As illustrated in FIG. 7 to FIG. 9, the right side rail member 111 includes a base member 1150, an attachment member 1130, a connecting member 1140, an upper bearing member 1170, and a lower bearing member 1180. Note that the left side rail member 112 has a configuration similar to that of the right side rail member 111.

First, the attachment member 1130 will be described. The attachment member 1130 extends along the first direction D1. Specifically, the attachment member 1130 includes a quadrangular tubular member extending along the first direction D1. The quadrangular tubular member includes an upper plate, a lower plate, and a pair of side plates. The upper plate and the lower plate face each other in the up-down direction. The side plates are disposed between the upper plate and the lower plate. The material of the attachment member 1130 is, for example, a metal.

The lower plate of the attachment member 1130 includes a slit 1133 extending through the lower plate in the up-down direction. The slit 1133 extends in the first direction D1 from an end portion of the attachment member 1130 on the side in the direction opposite to the first direction D1.

The attachment member 1130 is attached to the right side slide member 241. Specifically, the attachment member 1130 is attached to the upper plate 2511 of the right side slide member 241. The attachment member 1130 is attached to the side plate 2513 of the right side slide member 241. Specifically, the attachment member 1130 is in contact with the side plate 2513 of the right side slide member 241. Specifically, the side plate of the attachment member 1130 is in contact with a plurality of protruding portions 2513a on the side plate 2513 of the right side slide member 241. The plurality of protruding portions 2513a are arranged along the first direction D1. Each of the plurality of protruding portions 2513a protrudes in the second direction D2 from the side plate 2513. Specifically, the attachment member 1130 and the right side slide member 241 are fixed to each other.

The upper bearing member 1170 includes a substantially cylindrical member 1171 extending along the first direction D1 and a plurality of spherical members 1172. The plurality of spherical members 1172 are disposed along the first direction D1 inside the attachment member 1130. Specifically, the substantially cylindrical member 1171 includes a plurality of opening portions. Each of the plurality of opening portions opens toward the attachment member 1130. The plurality of spherical members 1172 are disposed in a plurality of recessed portions. The plurality of spherical members 1172 are rotatably disposed. The material of the substantially cylindrical member 1171 is, for example, a synthetic resin. The material of the plurality of spherical members 1172 is, for example, a metal.

Next, the base member 1150 will be described. The base member 1150 extends along the first direction D1. Specifically, the base member 1150 includes a quadrangular tubular member. The quadrangular tubular member includes an upper plate, a lower plate, and a pair of side plates. The upper plate and the lower plate face each other in the up-down direction. The side plates are disposed between the upper plate and the lower plate. The material of the base member 1150 is, for example, a metal.

The upper plate of the base member 1150 includes a slit 1153 extending through the upper plate in the up-down direction. The slit 1153 extends in the direction opposite to the first direction D1 from an end portion of the base member 1150 on the first direction D1 side.

The base member 1150 is disposed below the attachment member 1130. The base member 1150 is attached to the heating cooking chamber 100A. Specifically, the pull-out type heating cooking apparatus 100 further includes an attachment support portion 1120. The attachment support portion 1120 supports the base member 1150 and is attached to the right wall 1A. The attachment support portion 1120 is a bracket having a substantially L-shaped cross-section. Specifically, the attachment support portion 1120 includes a base plate portion 1122 and a support plate portion 1121. The base plate portion 1122 is a flat plate-like object. The support plate portion 1121 extends rightward from a lower edge portion of the base plate portion 1122. The base plate portion 1122 and the support plate portion 1121 are integrated. Specifically, the base member 1150 and the support plate portion 1121 are fixed to each other. Note that the base member 1150 is spaced apart from the side plate 2513 of the right side slide member 241.

The lower bearing member 1180 includes a substantially cylindrical member 1181 extending along the first direction D1 and a plurality of spherical members 1182. The plurality of spherical members 1182 are disposed along the first direction D1 inside the base member 1150. Specifically, the substantially cylindrical member 1181 includes a plurality of opening portions. Each of the plurality of opening portions opens toward the base member 1150. The plurality of spherical members 1182 are disposed in a plurality of recessed portions. The plurality of spherical members 1182 are rotatably disposed. The material of the substantially cylindrical member 1181 is, for example, a synthetic resin. The material of the plurality of spherical members 1182 is, for example, a metal.

Next, the connecting member 1140 will be described. The connecting member 1140 connects the attachment member 1130 and the base member 1150. The connecting member 1140 extends along the first direction D1.

Specifically, the connecting member 1140 includes an upper plate portion 1141, a lower plate portion 1142, and an intermediate portion 1143. The upper plate portion 1141 is an example of "first plate portion". The lower plate portion 1142 is an example of "second plate portion".

The upper plate portion 1141 is a plate-like member. The upper plate portion 1141 is perpendicular to the up-down direction. The upper plate portion 1141 is disposed in the attachment member 1130. Specifically, the connecting member 1140 is movable along the first direction D1 with respect to the attachment member 1130. Specifically, the upper plate portion 1141 is disposed within the upper bearing member 1170. The connecting member 1140 moves with respect to the attachment member 1130 via the upper bearing member 1170.

The lower plate portion 1142 is a plate-like member. The lower plate portion 1142 is perpendicular to the up-down direction. The lower plate portion 1142 is disposed in the base member 1150. Specifically, the connecting member 1140 is movable along the first direction D1 with respect to the base member 1150. Specifically, the lower plate portion 1142 is disposed in the lower bearing member 1180. The connecting member 1140 moves with respect to the base member 1150 via the lower bearing member 1180.

The intermediate portion 1143 connects the upper plate portion 1141 and the lower plate portion 1142. The intermediate portion 1143 is a plate-like member. The intermediate portion 1143 is perpendicular to the left-right direction. The intermediate portion 1143 is configured to pass through the slit 1133 of the attachment member 1130 and the slit 1153 of the base member 1150.

As described above with reference to FIG. 1 to FIG. 9, the right side rail member 111 includes the base member 1150, the attachment member 1130, and the connecting member 1140. The connecting member 1140 extends along the first direction D1. With the connecting member 1140 provided, rattling between the right side rail member 111 and the right side slide member 241 in the direction perpendicular to the first direction D1 can be reduced.

In particular, even when the lid portion 21 is positioned at the open position, part of the base member 1150 and part of the connecting member 1140 overlap each other in the left-right direction (second direction) and the up-down direction (third direction D3). In addition, part of the attachment member 1130 and part of the connecting member 1140 overlap each other. The strength of the overlapping region of the right side rail member 111 is high in the left-right direction (the second direction) and the up-down direction (the third direction D3). As a result, rattling between the right side rail member 111 and the right side slide member 241 can be reduced even when the lid portion 21 is positioned at the open position. Furthermore, when a heavy object H to be heated is placed on the placing portion 22 with the lid portion 21 being positioned at the open position, rattling between the right side rail member 111 and the right side slide member 241 can be reduced.

Further, the plurality of spherical members 1172 and the plurality of spherical members 1182 are disposed along the first direction D1 inside the attachment member 1130 and the base member 1150, respectively. As a result, the connecting member 1140 can be smoothly moved with respect to the attachment member 1130 and the base member 1150 with a small amount of force. In addition, since the base member 1150 is separated from the side plate 2513 of the right side slide member 241, the connecting member 1140 can be smoothly moved with respect to the base member 1150 with a small amount of force.

Next, a fixing method for fixing the right side slide member 241 and the attachment member 1130 will be described with reference to FIG. 7 to FIG. 9. The pull-out type heating cooking apparatus 100 further includes a first fixing member 1160. The first fixing member 1160 extends along the up-down direction (the third direction D3). The first fixing member 1160 fixes an end portion of the upper plate 2511 of the right side slide member 241 on the first direction D1 side and an end portion of the attachment member 1130 on the first direction D1 side. For example, the first fixing member 1160 is a screw. As a result, rattling between the right side slide member 241 and the attachment member 1130 can be reduced.

The pull-out type heating cooking apparatus 100 further includes a second fixing member 1161. The second fixing member 1161 extends along the left-right direction (the second direction D2). The second fixing member 1161 fixes an end portion of the side plate 2513 of the right side slide member 241 on the first direction D1 side and the end portion of the attachment member 1130 on the first direction D1 side. For example, the second fixing member 1161 is a screw. As a result, rattling between the right side slide member 241 and the attachment member 1130 can be reduced.

The attachment member 1130 further includes a third fixing member 1131. The third fixing member 1131 is disposed at an end portion of the attachment member 1130 on the side in the direction opposite to the first direction D1. Specifically, the third fixing member 1131 includes a horizontal plate portion 1131a and a connecting portion 1131b. The horizontal plate portion 1131a faces the upper plate of the attachment member 1130 in the third direction D3. The connecting portion 1131b connects the upper plate of the attachment member 1130 and the horizontal plate portion 1131a. The horizontal plate portion 1131a and the upper plate of the attachment member 1130 sandwich an end portion of the upper plate 2511 of the right side slide member 241 on the side in the direction opposite to the first direction D1. For example, the third fixing member 1131 is a hook. As a result, it is possible to suppress separation, in the third direction D3, between the end portion of the attachment member 1130 on the side in the direction opposite to the first direction D1 and the end portion of the right side slide member 241 on the side in the direction opposite to the first direction D1 due to the weight of the lid portion 21.

As illustrated in FIG. 5, FIG. 7, and FIG. 8, the upper plate 2511 of the right side slide member 241 further includes a notch 2514. The notch 2514 extends along the first direction D1 from the end portion of the right side slide member 241 on the side in the direction opposite to the first direction D1. The connecting portion 1131b is inserted into the notch 2514. As a result, it is possible to suppress separation, in the second direction D2, between the end portion of the attachment member 1130 on the side in the direction opposite to the first direction D1 and the end portion of the right side slide member 241 on the side in the direction opposite to the first direction D1.

Figure 10:
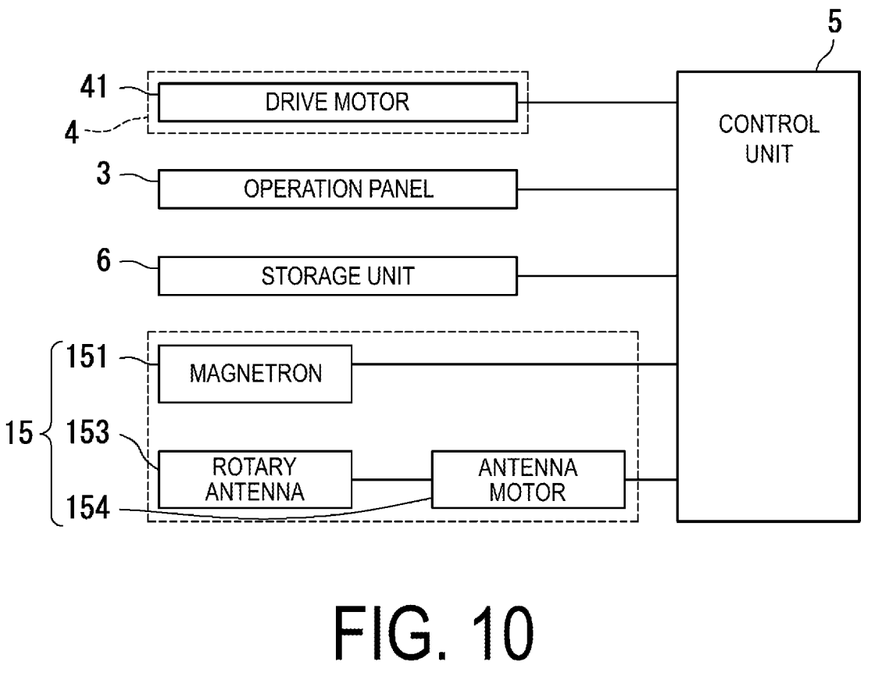
FIG. 10 is a block diagram illustrating a configuration of the pull-out type heating cooking apparatus according to the present embodiment.

A configuration of the pull-out type heating cooking apparatus 100 will be described in detail with reference to FIG. 10. FIG. 10 is a block diagram illustrating a configuration of the pull-out type heating cooking apparatus 100 according to the present embodiment.

As illustrated in FIG. 10, the control unit 5 controls the magnetron 151, the antenna motor 154, the drive motor 41, the operation panel 3, and the storage unit 6 by executing the control programs stored in the storage unit 6.

The control unit 5 controls driving of the microwave supply unit 15. Specifically, the control unit 5 drives the magnetron 151 and the antenna motor 154.

Figure 11:
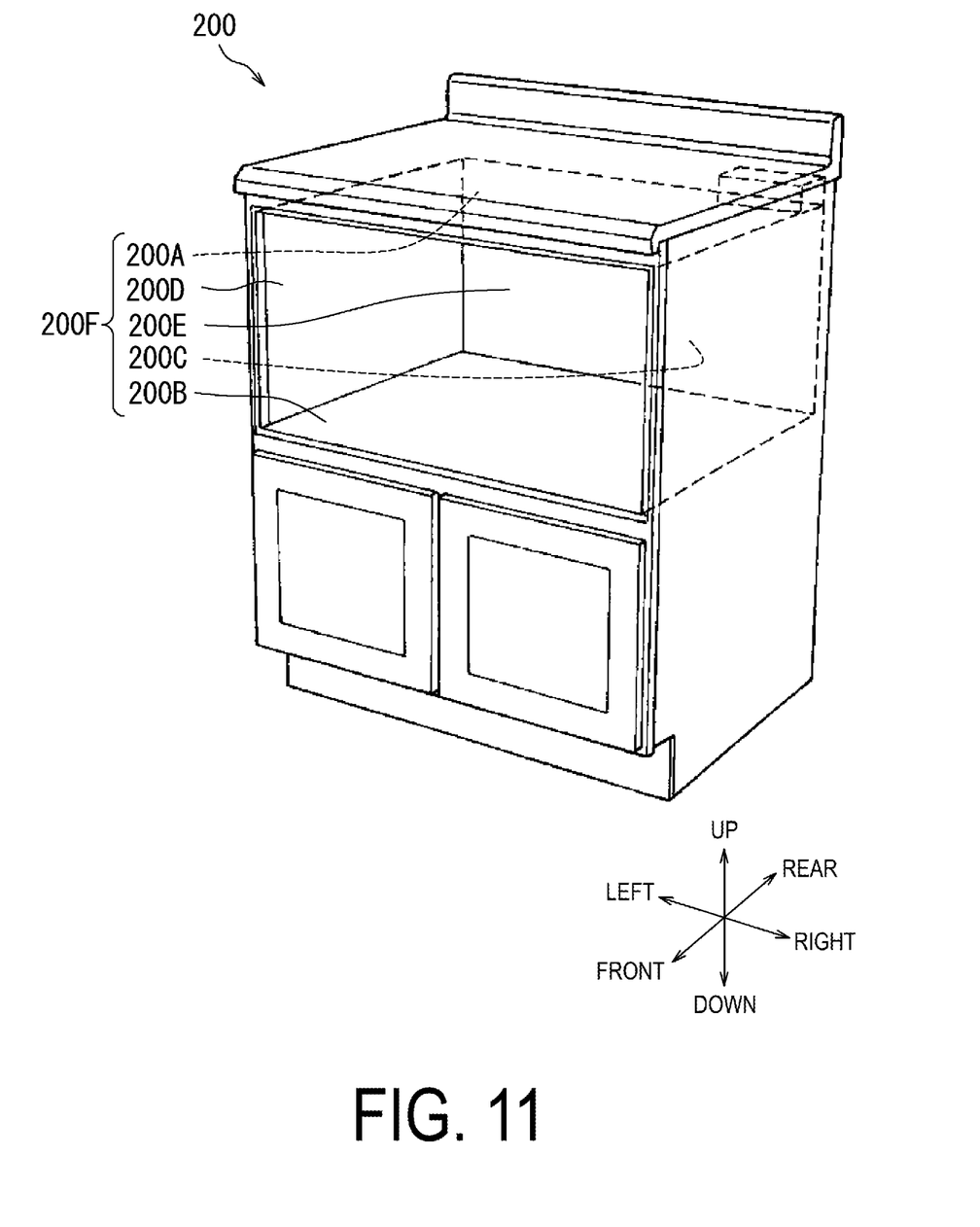
FIG. 11 is a perspective view illustrating a cabinet to which the pull-out type heating cooking apparatus according to the present embodiment is attached.

Subsequently, a cabinet 200 to which the pull-out type heating cooking apparatus 100 is attached will be described with reference to FIG. 11. FIG. 11 is a diagram illustrating an appearance of the cabinet 200 to which the pull-out type heating cooking apparatus 100 according to the present embodiment is attached.

The pull-out type heating cooking apparatus 100 is installed in the cabinet 200 in a built-in manner. As illustrated in FIG. 11, the cabinet 200 includes an upper wall 200A, a lower wall 200B, a right wall 200C, a left wall 200D, and a rear wall 200E. The upper wall 200A, the lower wall 200B, the right wall 200C, the left wall 200D, and the rear wall 200E form an accommodation portion 200F. The accommodation portion 200F is a rectangular parallelepiped space into which the pull-out type heating cooking apparatus 100 is fitted.

The embodiment of the present invention has been described above with reference to the accompanying drawings. However, the present invention is not limited to the embodiment described above, and the present invention can be implemented in various modes without departing from the gist thereof. The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. Further, the material, shape, dimensions, and the like of each of the constituent elements illustrated in the embodiment described above are merely examples and are not particularly limited, and various modifications can be made within the scope not substantially departing from the effects of the present invention.

(1) As described with reference to FIG. 1 to FIG. 11, the pull-out type heating cooking apparatus 100 includes the microwave supply unit 15, but the present invention is not limited thereto. For example, the pull-out type heating cooking apparatus 100 may further include an air supply unit that supplies hot air to the inside of the heating cooking chamber 100A.

(2) The pull-out type heating cooking apparatus 100 may further include a grill heater.

INDUSTRIAL APPLICABILITY

The present invention provides a heating cooking apparatus, and the provided heating cooking apparatus has industrial applicability.

REFERENCE SIGNS LIST

20 Wall portion
21 Lid portion
22 Placing portion
40 Heating chamber (housing)
100 Pull-out type heating cooking apparatus
100A Heating cooking chamber
111 Right side rail member (movement unit)
241 Right side slide member (support member)
1130 Attachment member
1132 Spherical member
1140 Connecting member
1141 Upper plate portion (first plate portion)
1142 Lower plate portion (second plate portion)
1143 Intermediate portion
1150 Base member
1152 Spherical member
1160 First fixing member
1161 Second fixing member
D1 Predetermined direction

The invention claimed is:
1. A heating cooking apparatus comprising:
a heating cooking chamber including an opening open in a predetermined direction included in a horizontal plane;
a lid portion configured to move between a closed position and an open position;
a support member extending in the predetermined direction from the lid portion; and a movement unit configured to cause the support member to move,
wherein the movement unit includes
a base member extending along the predetermined direction and attached to the heating cooking chamber,
an attachment member extending along the predetermined direction and attached to the support member, and
a connecting member extending along the predetermined direction and connecting the base member and the attachment member,
the closed position indicates a position at which the lid portion closes the opening,
the open position is positioned farther in the predetermined direction than the closed position and indicates a position at which the lid opens the opening, and
the connecting member is movable along the predetermined direction with respect to each of the base member and the attachment member.

2. The heating cooking apparatus according to claim 1, wherein the connecting member includes
a first plate portion disposed in the attachment member,
a second plate portion disposed in the base member, and
an intermediate portion connecting the first plate portion and the second plate portion, and
a plurality of spherical members are disposed along the predetermined direction inside each of the attachment member and the base member.

3. The heating cooking apparatus according to claim 1 further comprising:
a first fixing member extending along an up-down direction,
wherein the first fixing member fixes an end portion of the support member on a side of the predetermined direction and an end portion of the attachment member on the side of the predetermined direction.

4. The heating cooking apparatus according to claim 3 further comprising:
a second fixing member extending along a direction intersecting the predetermined direction and intersecting the up-down direction,
wherein the second fixing member fixes the end portion of the support member on the side of the predetermined direction and the end portion of the attachment member on the side of the predetermined direction.

5. The heating cooking apparatus according to claim 3, wherein the support member includes
an upper plate extending along the predetermined direction, and
a side plate extending downward from the upper plate,
the attachment member is disposed above the base member,
the attachment member is in contact with the side plate of the support member, and
the base member is separated from the side plate of the support member.

6. The heating cooking apparatus according to claim 5, wherein the attachment member includes
an upper plate extending along the predetermined direction, and
a third fixing member disposed at an end portion of the upper plate on a side in a direction opposite to the predetermined direction,
the third fixing member includes
a horizontal plate portion facing the upper plate of the attachment member in the up-down direction, and
a connecting portion connecting the upper plate of the attachment member and the horizontal plate portion, and
the horizontal plate portion and the upper plate of the attachment member sandwich an end portion of the upper plate of the support member on the side in the direction opposite to the predetermined direction.

7. The heating cooking apparatus according to claim 6, wherein the support member further includes a notch extending along the predetermined direction from the end portion of the upper plate on the side in the direction opposite to the predetermined direction, and
the connecting portion is inserted into the notch.

8. The heating cooking apparatus according to claim 1 comprising:
a housing accommodating the heating cooking chamber;
a pair of the movement units; and
a pair of the support members,
wherein the pair of movement units and the pair of support members are disposed between the housing and the heating cooking chamber.

9. The heating cooking apparatus according to claim 8 further comprising:
an accommodation portion attached to the lid portion and configured to be accommodated in the heating cooking chamber,
wherein the accommodation portion includes
a placing portion on which an object to be heated is placed, and
a pair of wall portions extending upward from a peripheral edge portion of the placing portion, and
the pair of wall portions include upper ends positioned higher than upper ends of the movement units.

* * * * *